United States Patent [19]
Ramond

[11] 4,008,903
[45] Feb. 22, 1977

[54] FORK FOR STEERING WHEEL OF VARIOUS CYCLES

[76] Inventor: Louis Maurice Ramond, 28, rue de la Baume, 42100 Saint-Etienne, France

[22] Filed: Mar. 25, 1975

[21] Appl. No.: 561,835

[30] Foreign Application Priority Data

Mar. 29, 1974 France .................. 74.11908

[52] U.S. Cl. ...................... 280/279; 188/24; 280/152.1
[51] Int. Cl.² ........................... B62K 21/02
[58] Field of Search .......... 280/279, 274, 152.1, 280/152.2, 152.3; 188/24

[56] References Cited
UNITED STATES PATENTS

| | | | |
|---|---|---|---|
| 400,074 | 3/1889 | Gendron | 280/279 X |
| 668,546 | 2/1901 | Sutherland | 280/279 |

FOREIGN PATENTS OR APPLICATIONS

| | | | |
|---|---|---|---|
| 978,562 | 4/1951 | France | 280/288 |
| 978,252 | 4/1951 | France | 280/279 |
| 1,446,053 | 6/1966 | France | |
| 528,324 | 6/1931 | Germany | 280/279 |
| 261,528 | 9/1947 | Switzerland | 280/279 |
| 13,134 | 10/1886 | United Kingdom | 280/279 |
| 1,361,394 | 7/1974 | United Kingdom | 280/281 R |
| 211,023 | 2/1924 | United Kingdom | 280/274 |
| 487,659 | 6/1938 | United Kingdom | 280/279 |
| 488,737 | 7/1938 | United Kingdom | 280/281 |

Primary Examiner—Joseph F. Peters
Assistant Examiner—John P. Silverstrim
Attorney, Agent, or Firm—Brooks Haidt Haffner & Delahunty

[57] ABSTRACT

A steering fork for cycles, e.g., bicycles, motorcycles, etc., preferably moulded from a plastics material, having an upper stock portion with bearings for receiving the cycle frame pivot pin and with a handlebar mounting bracket and having a pair of downwardly extending, spaced apart arms for receiving the cycle front wheel therebetween. The arms have openings and means for mounting brake jaws in the arms so that brake pads on the jaws can pass through the openings and engage the wheel rim. The wheel axle is received in openings at the lower ends of the arms and preferably, the openings are at least partly surrounded by tapered projections receivable in recessed nuts on the axle. The stock portion has one or more tubular portions for receiving one or more handlebar mounting bracket extensions and means for clamping the extensions at the desired height.

8 Claims, 7 Drawing Figures

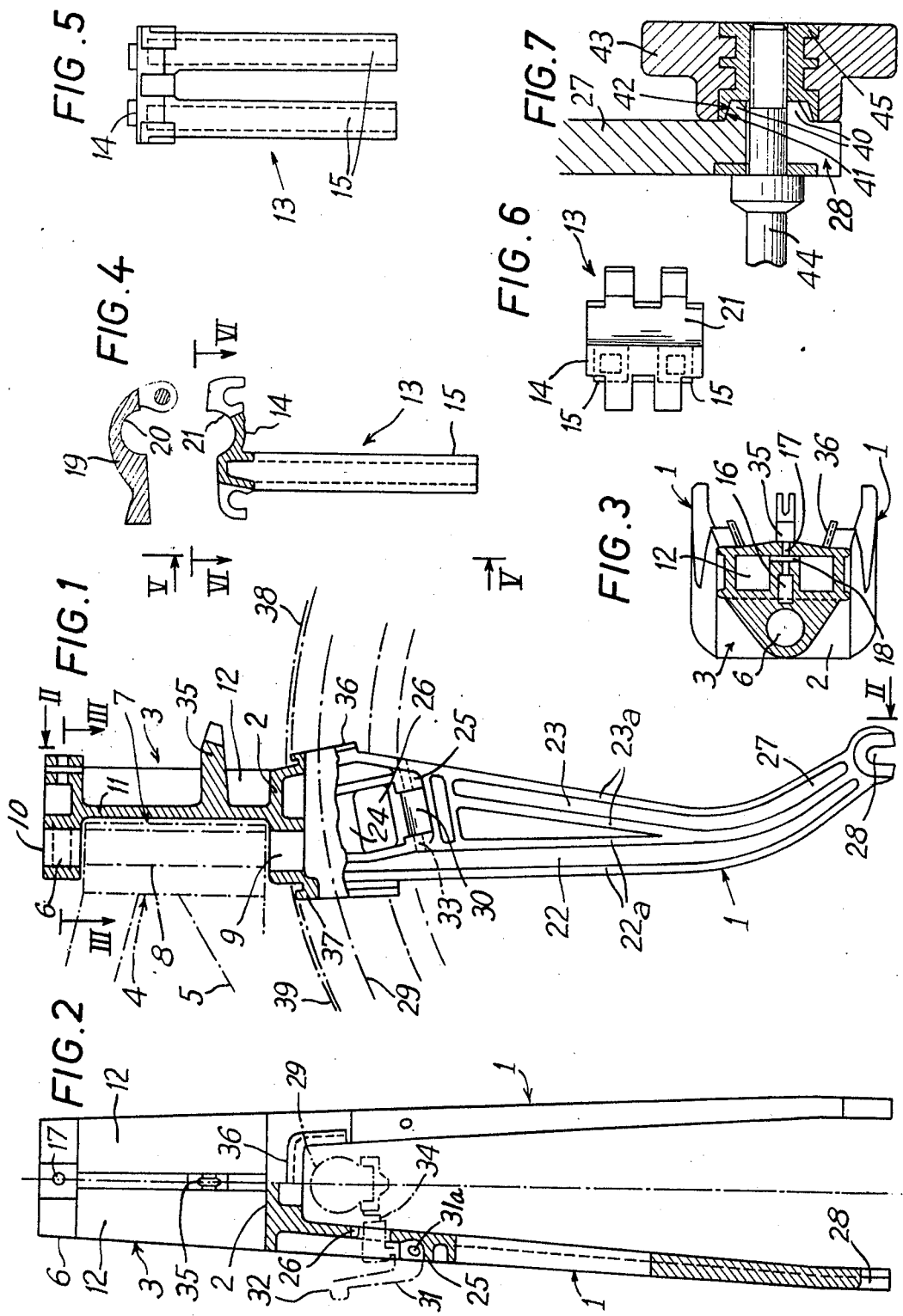

FORK FOR STEERING WHEEL OF VARIOUS CYCLES

The present invention relates to a fork for the steering wheel of different forms of cycle, notably bicycles or motorised cycles. The fork has a new structure particularly chosen to allow moulding either in metal or in plastics material.

The structure of the fork according to the invention is also designed to allow mounting of the brake jaws in order to entirely suppress the flexing forces which appear, in braking, in the pivoted supports normally used for supporting the shoes or wear members cooperating with the rim of the wheel to be braked.

Various other characteristics will appear from the description below, given with reference to the attached drawings which show, by way of example, an embodiment of the invention.

FIG. 1 is an elevation view of a fork according to the invention, partly cut away;

FIG. 2 is a front view, half in section, taken on the line II—II in FIG. 1;

FIG. 3 is a section on the line III—III;

FIG. 4 is an elevation and a section of one of the elements comprising the fork; and FIGS. 5 and 6 are views on the lines V—V and VI—VI.

FIG. 7 is a partial section of a second embodiment of one of the elements according to the invention.

According to the form of the invention shown in FIGS. 1 and 2, the fork is made entirely of an appropriate plastics material, for example polycarbonate, polyamide or polyester, reinforced with glass fibres. The fork has two arms 1, extending in slightly divergent directions from a common root 2 away from a stock 3. The latter is intended for the mounting and support of the handle bar and is itself mounted on the steering pivot 4 of a frame 5 represented in dot-dash lines in FIG. 1. The stock 3 takes the form of a bridge which defines, between the root 2 and a head 6, a recess 7 for receiving the steering pivot 4. The link between the stock 3 and the steering pivot 4 is made by a steering pin or shaft 8 centered within the pivot 4, the end parts being maintained in bearings 9 and 10 in the root 2 and the head 6. The particular structure of the stock 3 as described above is thus carefully designed for mounting of the fork on the steering pivot 4 by means of the steering pin or shaft 8. The latter is axially fixed after engagement in the bearings 9 and 10 by means, for example, of a shoulder at one end and a threaded end cap on the other end of the pin. Such a method of construction allows the threading of the threaded end cap to be used for varying the tension on the stock 3 and for regulating the axial play and the angular freedom between the fork and the steering pivot 4.

FIGS. 1 to 3 show that the bearings 9 and 10 are in the left hand part of the stock 3, considered in plan view. The right hand part of the stock beyond a connecting web 11 defines two parallel casings 12 of polygonal form extending between the head 6 and the root 2. The casings 12 are intended to receive a steering bracket 13, which according to the invention is also made entirely of a suitable plastics material, in particular polycarbonate, polyamide or polyester, reinforced with glass fibres. As seen in FIGS. 4 to 6, the bracket 13 has a half clamp 14 with two parallel extensions 15 of polygonal section complementary to that of the casings 12. The extensions 15 can be in the form of solid stems, or can be tubular, their length being different from or equal to the height or depth of the casings 12. The bracket 13 is held axially relative to the stock 3 in the position required or determined by means of a screwed member, such as a bolt extending freely through the part of the head 6 between the casings 12 and being threaded into an insert positioned in a hole 16 reserved for it. The hole 16 communicates with a passage 17 which crosses a slit or cut 18 in the upper frontal part of the head 6 which isolates a deformable portion thereof. This ensures that when the locking bolt is screwed up, the extensions 15 are locked axially in the interior of the casings 12.

The bracket 13 is completed by a top clamp 19, also manufactured in plastics material, which defines on one of its faces a semi-cylindrical seating 20 complementary to a seating 21 in the upper face of the clamp 14, which together receive the middle part of the cross piece of a handle bar (not shown in the drawings). FIG. 4 shows that the top clamp 19 is preferably formed in such a way that it can be mounted and demounted rapidly from the bracket 14. It is normally fixed in such a way as to hold the handle bar firmly, using a threaded member, or a cam or wedge-type locking member.

According to another characteristic of the invention, each arm 1 is formed by two U-profiles 22 and 23 extending in the same way from the root 2, at first being substantially parallel and connected by means of a wall 24. The profiles 22 and 23 are preferably of a U-type and are orientated with their ribs 22a and 23a directed outwardly of the arm. The profiles 22 and 23 are united by a moulding 25 which extends close to the bottom of a window 26 in the wall 24. Beyond the moulding 25, the profiles 22 and 23 take converging directions and then together form a curved part 27 in common, which ends in an open bearing 28 for the mounting of the axle of the hub of a wheel 29, such as is shown in dot-dash lines in FIG. 2.

The moulding 25, which extends substantially perpendicular to the longitudinal axis of the fork, is formed so as to provide a recess 30 of semi-circular shape for the mounting of a brake jaw 31. The latter is held by means of a pivot pin 31a, the ends of which are placed in bearings 33 provided in the moulding 25. The brake jaw 31 shown in dot-dash lines in FIG. 2 carries a friction pad 34 which is removable and which enters the window 26 so as to align with the rim of the wheel 29. The brake jaw 31 also forms a lever 32 on which is attached the end of a tension cable, the sheath of which, not shown in the drawings, bears on the fork of a guide finger 35 formed as a projection of the wall 11.

The brake jaws 31 are thus directly mounted for pivoting on independent axes disposed parallel to the plane of rotation of the wheel and receive no flexing loads during application of the brakes 34 on the rim of the wheel 29, as has been the case with pivoted supports for brake jaws of traditional construction. Such an arrangement leads to an extended life for the different linked parts of a front brake, but also and more importantly, leads to considerable improvement in the braking action of the pads 34.

As well as the different advantages mentioned above, it should be noted that the fork according to the invention and the support bracket for the handlebars are constructed in plastics material and thus have, for equal mechanical strength, a lower weight. Moreover, the use of an appropriate plastics material as a construction material allows the manufacture of the finished products which have a new and durable aesthetic appeal, for example, due to colouring in the material.

According to a further arrangement according to the invention, the forward and rearward surfaces of the arms 1 and the root 2 form two shouldered ledges 36 and 37 having channels of inverted U-shape. These can receive two half mud-guards 38 and 39, also in plastics material, which clip in position and which project in each direction from the fork in the plane of rotation of the wheel.

The invention can be applied to various forms of cycles, but has its preferred application in the construction of touring bicycles.

According to another characteristic of the invention shown by FIG. 7, each open bearing 28 is edged by a flange or projection 40 extending from the outer face of the arm 1 of the fork. The flange 40 forms an external partial bearing 41 in the shape of truncated cone which is concentric with the open bearing 28. The bearing 41 co-operates with a complementary seat 42 provided in a nut 43 screwed on the shaft 44 of a wheel. The bearing 41 and the seat 42 ensure together a locking against a disengagement of the shaft from the open bearing 28 in case of partial unscrewing of the nut 43. Preferably, the seat 42 is provided in a metallic piece such as a tubular threaded core over which the nut 43 is moulded.

The invention is not limited by the embodiments shown and described in detail, since many modifications can be made without departing from its scope. In particular, the fork can alternatively be made by moulding or casting of a metal alloy in place of a plastics material.

Moreover, in certain cases, the stock 3 can be replaced by a tubular stock of traditional type, one end of which is provided with an attached structure which constitutes a base upon which can be moulded the root 2 and in part the heads of the arms 1.

What we claim is:

1. A fork for receiving a steering wheel of a cycle, said wheel having a rim and an axle and said cycle having a frame, a handlebar and braking means including oppositely disposed brake jaws, each jaw having a brake pad for engagement with a side of said rim, said fork having a central portion which has a transverse portion which extends transversely to the plane of the wheel and a pair of spaced portions extending downwardly from the transverse portion and parallel to and on opposite sides of the plane of said wheel to thereby overlie said wheel in spaced relation to the periphery and sides of said wheel when it is received in said fork, and having a stock portion extending upwardly from and integral with said central portion, said stock portion having bearing means substantially co-axial with a pivot axis in said plane for pivotally engaging said frame and having handlebar support means for supporting mounting means for said handlebar, said fork also having a pair of spaced apart arms extending downwardly from said spaced, downwardly extending portions of said central portion for receiving said wheel therebetween, each of said arms comprising a pair of arm portions integral with and extending downwardly from said spaced, downwardly extending portions of said central portion and lying substantially in a plane substantially parallel to said plane of said wheel, said arm portions being spaced apart in the direction parallel to said plane of said wheel at the upper ends thereof at said spaced, downwardly extending portions of said central portion and converging and being integral with each other at the opposite, lower ends thereof, each of said arm portions being U-shaped in cross-section and each of said arms having an opening at the lower end thereof for receiving an end of said axle and having means adjacent said spaced, downwardly extending portions of said central portion for receiving and mounting one of said brake jaws intermediate the spaced apart portions of said arm portions for engagement of said pad on said jaw with said rim, and at least said arms and said central portion being made of a plastics material.

2. A fork as set forth in claim 1, wherein said axis extends upwardly from and intersects said central portion, said stock portion has a web extending upwardly from said central portion, transversely to said plane in offset relation to said axis, said frame has a pivot pin and said bearing means comprises first and second cylindrical bearings mounted respectively at the upper and lower ends of said web and disposed toward said axis with respect to said web for receiving said pin.

3. A fork as set forth in claim 1, wherein said fork is made of a plastics material.

4. A fork as set forth in claim 1, wherein said axle has a pair of nuts thereon with oppositely and inwardly facing tapered seats therein and wherein said opening at the end of each of said arm for receiving an end of said axle has an outwardly facing tapered projection at least partly therearound of a shape complementary to the shape of said seats and receivable within one of said seats.

5. A fork as set forth in claim 4, wherein each of said seats is in the shape of a truncated cone and each said tapered projection is in the shape of a truncated cone having an axial bore and a radially extending slot for receiving said axle.

6. A fork for receiving a steering wheel of a cycle, said wheel having a rim and an axle and said cycle having a frame, a mudguard, a handlebar and braking means including oppositely disposed brake jaws, each jaw having a brake pad for engagement with a side of said rim, said fork having a central portion which extends both transversely and parallel to the plane of said wheel to thereby overlie said wheel in spaced relation to said wheel when it is received in said fork, and having a stock portion extending upwardly from said central portion, said stock portion having bearing means substantially co-axial with a pivot axis in said plane for pivotally engaging said frame and having handlebar support means for supporting mounting means for said handlebar and said central portion also having a pair of transverse channels therein, one on each side of said central portion, for receiving portions of said mudguard, said fork also having a pair of spaced apart arms extending downwardly from said central portion for receiving said wheel therebetween, each of said arms comprising a pair of arm portions integral with and extending downwardly from said central portion and lying substantially in a plane substantially parallel to said plane of said wheel, said arm portions being spaced apart in the direction parallel to said plane of said wheel at the upper ends thereof at said central portion and converging and being integral with each other at the opposite, lower ends thereof, each of said arm portions being U-shaped in cross-section and each of said arms having an opening at the lower end thereof for receiving an end of said axle and having means adjacent said central portion for receiving and mounting one of said brake jaws intermediate the spaced apart portions of said arm portions for engagement of said pad on said jaw with said rim, and at least said arms and said central portion being made of a plastics material.

7. A fork for receiving a steering wheel of a cycle, said wheel having a rim and an axle and said cycle having a frame, a handlebar and braking means including oppositely disposed brake jaws, each jaw having a brake pad for engagement with a side of said rim, said fork having a central portion which extends both transversely and parallel to the plane of said wheel to thereby overlie said wheel in spaced relation to said wheel when it is received in said fork, and having a stock portion extending upwardly from said central portion, said stock portion having bearing means substantially co-axial with a pivot axis in said plane for pivotally engaging said frame and having handlebar support means for supporting mounting means for said handlebar, said fork also having a pair of spaced apart arms extending downwardly from said central portion for receiving said wheel therebetween, each of said arms comprising a pair of arm portions integral with and extending downwardly from said central portion and lying substantially in a plane substantially parallel to said plane of said wheel, said arm portions being spaced apart in the direction parallel to said plane of said wheel at the upper ends thereof at said central portion and converging and being integral with each other at the opposite, lower ends thereof, each of said arm portions being U-shaped in cross-section and each of said arms having an opening at the lower end thereof for receiving an end of said axle and having means adjacent said central portion for receiving and mounting one of said brake jaws intermediate the spaced apart portions of said arm portions for engagement of said pad on said jaw with said rim, and at least said arms and said central portion including said stock portion thereof being made of a plastics material and said stock portion having a metal core.

8. A fork for receiving a steering wheel of a cycle, said wheel having a rim and an axle and said cycle having a frame, a handlebar and braking means including oppositely disposed brake jaws, each jaw having a brake pad for engagement with a side of said rim, said fork having a central portion which extends both transversely and parallel to the plane of said wheel to thereby overlie said wheel in spaced relation to said wheel when it is received in said fork, and having a stock portion extending upwardly from said central portion, said stock portion having bearing means substantially co-axial with a pivot axis which is in said plane and extends upwardly from and intersects said central portion for pivotally engaging said frame and having handlebar support means for supporting mounting means for said handlebar, said stock portion having a web extending upwardly from said central portion in offset relation to said axis and having a pair of spaced tubular portions secured to said web and extending generally parallel to said axis, said tubular portions being disposed on the opposite side of said web with respect to said axis and forming said handlebar support means, said frame having a pivot pin and said bearing means comprising first and second cylindrical bearings mounted respectively at the upper and lower ends of said web for receiving said pin, said handlebar mounting means comprising a rigid member having a pair of extensions in spaced apart relation and receivable in said tubular portions, said extensions having a cross-sectional shape corresponding to the inner cross-sectional shape of said tubular portions, said rigid member having means for clamping said handlebar thereon, said fork also having a pair of spaced apart arms extending downwardly from said central portion for receiving said wheel therebetween, each of said arms comprising a pair of arm portions integral with and extending downwardly from said central portion and lying substantially in a plane substantially parallel to said plane of said wheel, said arm portions being spaced apart in the direction parallel to said plane of said wheel at the upper ends thereof at said central portion and converging and being integral with each other at the opposite, lower ends thereof, each of said arm portions being U-shaped in cross-section and each of said arms having an opening at the lower end thereof for receiving an end of said axle and having means adjacent said central portion for receiving and mounting one of said brake jaws intermediate the spaced apart portions of said arm portions for engagement of said pad on said jaw with said rim, and at least said arms and said central portion being made of a plastics material.

* * * * *